Oct. 10, 1961 J. W. ANDERSON 3,003,174
WINDSHIELD WIPER BLADE AND METHOD OF PRODUCTION
Filed March 25, 1957 2 Sheets-Sheet 2

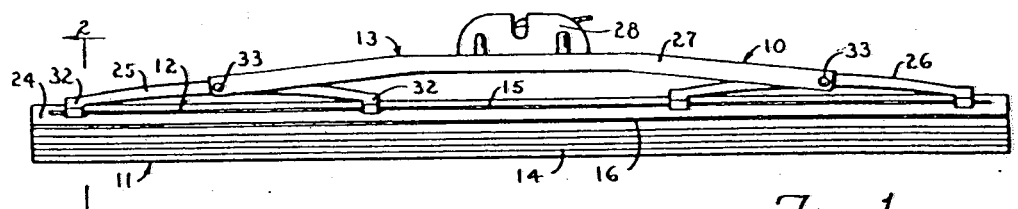
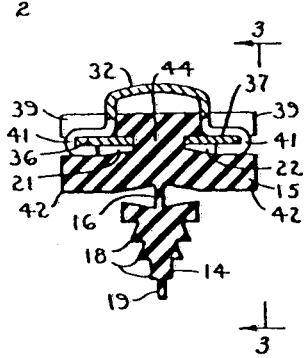
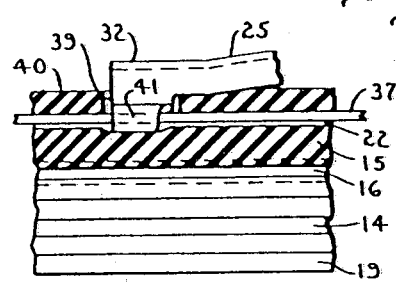
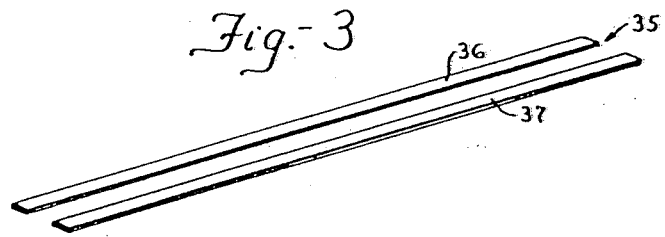
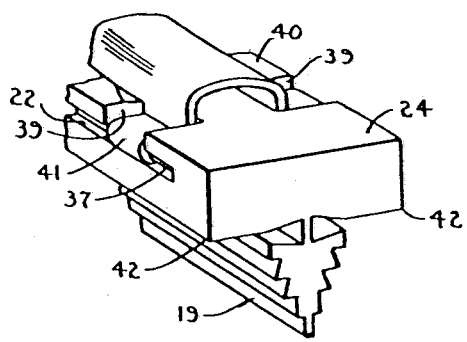
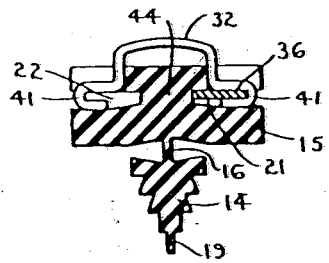

INVENTOR.
JOHN W. ANDERSON
BY
Redrow & Recktenwald
ATTORNEYS

United States Patent Office 3,003,174
Patented Oct. 10, 1961

3,003,174
WINDSHIELD WIPER BLADE AND METHOD OF PRODUCTION
John W. Anderson, 578 Broadway, Gary, Ind.
Filed Mar. 25, 1957, Ser. No. 648,148
6 Claims. (Cl. 15—250.42)

This invention relates generally to windshield wiper apparatus and more particularly is directed to a wiper blade assembly and the method of making same.

Currently, the majority of wiper blade apparatus used on both flat and curved surfaces of windshields comprise a flexible backed blade and a pressure-distributing device operatively connected to the blade in such a manner as to substantially distribute the pressure from the windshield wiper arm evenly over the surface of the blade such as is covered by my U.S. Patent 2,596,063. Use of the basically new type of blade has produced profound results in the efficient cleaning of windshields that has contributed immeasurably to the improved safety of the modern-day motor vehicle.

As part of a continuing program to refine the broad teachings of the above-referred-to patent, new structures and methods are being evolved which significantly advance the state of the art. It is, therefore, a principal object of this invention to provide an improved windshield wiper blade assembly including desirable features not present in the currently marketed wiper blades.

More specifically, it is an important object of this invention to provide an improved wiper blade structure wherein the secondary yokes of the pressure-distributing device have receiving means in which a pair of flexible support means carried in grooves in the resilient wiper element of the blade are seated for simultaneously holding said support means assembled in the resilient wiper element and for holding the pressure-distributing device connected to the blade.

Another significant object of this invention is to provide an improved wiper blade assembly wherein the noise and vibration occurring between the movable components of the assembly are reduced to a minimum.

A still further object of this invention is to provide an improved wiper blade assembly wherein all metal parts associated with the resilient wiper element are recessed in both a sidewise and endwise direction such that no metal parts are exposed to scratch or mar a windshield.

And still an additional object of this invention is to provide an improved wiper blade assembly wherein the resiliency of the material forming the wiper element of the blade serves to retain the flexible support means in seated relation with the receiving means of the pressure-distributing device.

A further object of this invention is to provide an improved method of assembling a wiper blade assembly that is less complicated, less expensive and more efficient.

Other objects and advantages of the invention will become evident when the description herein set forth is considered in conjunction with the drawings annexed hereto.

FIGURE 1 is a side elevational view of a windshield wiper blade embodying the features of the present invention;

FIGURE 2 is a cross-sectional view of the blade taken along the line 2—2 of FIGURE 1;

FIGURE 3 is a cross-sectional view taken along the line 3—3 of FIGURE 2;

FIGURE 4 is a perspective view of the flexible supports forming an important part of the present invention;

FIGURE 5 is a perspective view of one end portion of a wiper blade as illustrated in FIGURE 1;

FIGURE 6 is a cross-sectional view showing certain parts in position according to one method of manufacture;

Figure 7:
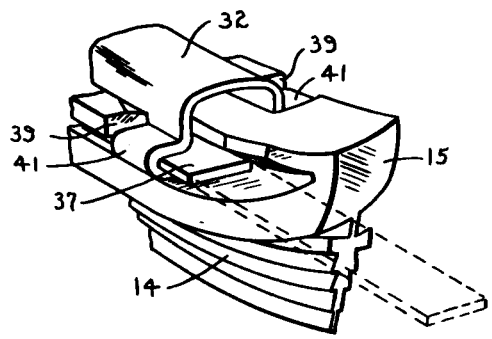
FIGURE 7 illustrates the final step in the method of assembly illustrated in FIGURE 6.

The windshield wiper blade assembly 10, as exemplified in the drawings, comprises a resilient wiper element 11, an elongate uniformly flexible support 12 detachably secured thereto, and a pressure-distributing device 13. The resilient wiper element 11 is composed of two parts, a wiper head portion 14 and an attaching or back portion 15 which are joined together by a thin intermediate hinge 16 so that the wiping head portion may move laterally with respect to the back portion when the blade is moved back and forth across the windshield. The head portion 14 has several outwardly extending edge portions 18 tapered gradually downwardly to a surface contacting wiping edge 19 adapted to contact a windshield for cleaning the surface thereof.

The back portion 15 of the wiper element is relatively thick in the vertical direction and has a pair of matching grooves 21, 22 formed in the opposite sides thereof extending substantially the full length of said back portion. On the ends of each groove is an abutment means or end wall 24 for sealing off the ends of the grooves from communication with the tip ends of the blade. The form of each groove in the back portion 15 is such as to provide what is commonly called a blind groove, and is particularly important in this invention, as will become more apparent hereinafter.

Fastened on the back portion 15 of the wiper element 11 is the pressure-distributing device 13 which, in the illustrated form, is adapted to engage the wiper blade in a manner to evenly distribute a force across the full length of the blade. The pressure-distributing device may be constructed in various ways, but as herein illustrated preferably includes a pair of corresponding secondary yokes 25 and 26, and a primary yoke 27. A connector 28 of any suitable form may be fixedly carried at about the midpoint of the bridge 27 for detachably connecting the wiper blade assembly to a spring loaded wiper arm (not shown).

The ends of the secondary yokes are provided with receiving means 32 connected to the blade at longitudinally spaced points or locations and the ends 33 of the primary yoke 27 are pivotally connected to intermediate portions of the secondary yokes 25, 26.

A flexible supporting means 35, constituting an important feature of the instant invention, is best shown in FIGURE 4 and is composed of two elongate rectangularly shaped flexible members 36, 37 which are adapted to be resilient or flexible in a single plane and to be substantially inflexible in a plane perpendicular thereto. Each of said flexible members 36, 37 is adapted to be nested within the grooves 21, 22, respectively, formed in the sides of the back portions of the wiper blade so that the exposed sides of the members are positioned substantially entirely laterally within the confines of its nesting groove. A plurality of notches 39 are cut from the back flap 40 of the back portion 15, the notches communicating with the grooves 21, 22 and being formed in matching pairs on the opposite sides of the back portion of the resilient wiper element.

The receiving means 32 of the secondary yokes 25, 26 are formed with inwardly facing clips or claws 41 which, in FIGURE 2, are adapted to slidingly, but embracingly as viewed engage with the exposed edges of the flexible members 36, 37 through the notches 39 in the back portion. Since the flexible members are seated in the blind grooves, they are confined against movement longitudinally in either direction along the length of the wiper blade. In like manner, since the clips 41 on the ends of the secondary yokes slidably but otherwise firmly support the members by surrounding a portion of the outwardly disposed sides of the flexible members, it becomes readily apparent that a completed assembly is obtained without the need for additional fastening means for holding the flexible members 36, 37 together or for holding the pressure-distributing device in engagement with the blade.

The lower edge portions or flaps 42 of the sides of the back portion 15 of the wiper blade are adapted to extend laterally beyond the outer extremities of the clips 41 on the secondary yokes 25, 26 and beyond the outer exposed edges of the flexible members 36, 37 so that as the wiper blade is moved back and forth across a windshield it is impossible for any metal parts of the wiper blade assembly to come in contact with the surface of the windshield whereby scratching of the windshield is prevented. Said lower edge portions 42 of the back portion 15 further acts as a wiping edge if the blade should ever be rolled over on its side to the point that said edge 42 is brought in contact with a surface of a windshield. This adds an additional wiping element to the wiping blade.

One of the important features of the instant invention relates to the flexible support members and their method of assembly in a wiper blade. By referring to the above-mentioned patent and to other current wiper blades on the market today, it is seen that the uniformly flexible support adapted to be connected between the pressure-distributing device and the wiping element is generally a one-piece structure. One such device takes the form of an elongate slot stamped throughout substantially the full length of the flexible member which is adapted to be connected with the resilient wiper blade.

According to the present invention, an elongate strip of relatively thin spring-type or flexible metal is cut to the correct length by any one of several well-known simple cutting operations which materially reduces both the expense and the complexity in manufacturing the flexible supporting members. By the specific construction of the resilient wiper blade with the blind grooves formed therein, it becomes possible to nest the improved, rectangularly shaped flexible supports in the grooves without the necessity of rigidly interconnecting the two sides thereof, as has previously been the case.

One of the particular advantages of the simplified construction of the flexible support means relates to the method of assembling a wiper blade which may be accomplished in several different ways, the preferred forms being illustrated. FIGURES 6 and 7 illustrate one form of assembly wherein the flexible member 36 is embedded in the groove 21 on one side of the back portion 15 whereupon some of the clips 41 of the receiving members 32 of the pressure-distributing means are positioned through the notches 39 and into engagement with the outwardly disposed edge portion of said flexible support. The other clips 41 of the receiving means 32 of the pressure-distributing device are then disposed through the notches 39 and in alignment with the other groove 22 in the back portion. The extreme end of the wiping element 11, including end wall 24, may then be turned backwardly by applying pressure outwardly and toward the assembled portion of the wiper blade, as viewed in FIGURE 7, whereby one blind end 24 of the groove 22 is pivoted out of position such that a second flexible member 37 may be longitudinally slid or threaded into the groove 22 and through the aligned clips 41 on that side of the receiving means of the pressure-distributing device. When the full length of the flexible member 37 is disposed in the groove 22, the deformed end portion of wall 24 of the groove 22 is released so as to permit it to return to its initial position to cover the end of groove 22 and the end of the flexible member 37. The assembled blade is now ready for use and can be attached to the arm of a windshield wiper system.

Figure 8:
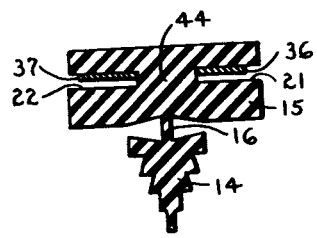
FIGURE 8 illustrates one step in a different method of assembly.
Figure 9:
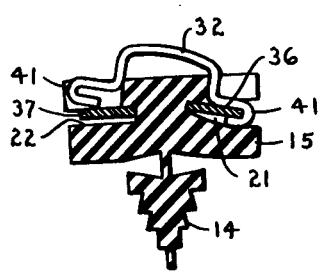
FIGURE 9 illustrates a further step in the method of assembly illustrated in FIGURE 8.
Figure 10:
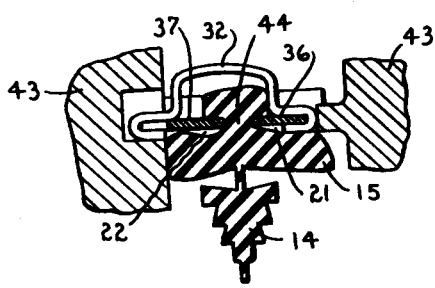
FIGURE 10 illustrates the final step in the method of assembly illustrated in FIGURES 8 and 9.

A second method of assembling the pressure-distributing device onto flexible members of the wiping element of a blade assembly is illustrated in FIGURES 8, 9 and 10 wherein the two flexible members 36, 37 are simultaneously disposed in the matching grooves 21, 22 in the back portion, substantially as shown in FIGURE 8. The clips 41 on the receiving means 32 on one side of the pressure-distributing device are engaged with the one exposed edge portion of the flexible member 36 through the notches 39 in the back portion with the other clips 41 on the gripping means disposed on top of the other flexible member 37. While holding the flexible element 37 relatively immobile and by means of a pressing device 43, the receiving means 32 and flexible member 36 on the assembled side of the blade are pressed inwardly against the resilience of the dividing wall 44 between the grooves in the back portion until the nonengaged receiving means 32 of the pressure-distributing device is in position to drop into alignment with the outer edge portion of the other flexible member 37 whereupon, by releasing the pressure device 43, the resilience of the wiping element and wall 44 will cause it to return to its original shape and cause the receiving means 32 to engage with the other flexible member 37 for completing the assembly of the wiper blade.

Figure 11:
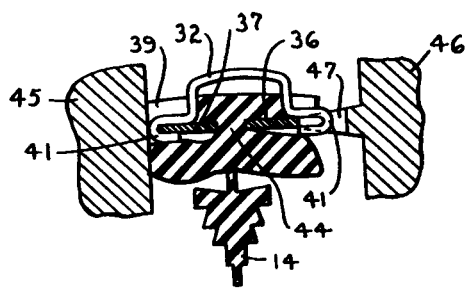
FIGURE 11 illustrates an alternate form of FIGURE 10 showing the final assembly step.

FIGURE 11 illustrates a slightly modified form of FIGURE 10 wherein a member 45 is fixed in a stationary position for providing a backing for the assembled side of the wiper blade. A movable thrust member 46 with a cutout 47 for the clips 41 of the receiving means 32 is adapted to come in contact with the exposed edge of the flexible member 36 and move same toward the backing member 45 until the clips 41 clear the edge of the flexible member 36 whereupon the secondary yoke drops into position with the receiving means 32 positioned through the notches 39 in the back of the back portion 15. Upon release of the pressure on the flexible member 36, the rubber in the back portion 15 will expand and force the flexible member 36 into the clips 41 whereupon a completed wiper blade is produced.

In view of the above, it will be obvious that various novel devices have been provided for producing an improved flexible mounting means for a wiping blade, including a new arrangement for connecting the pressure device to said flexible mounting means. The nature of the connection between the pressure device and the blade is such as to maintain the flexible mounting means assembled with the wiper element through the forces produced by the resilience of the web between the respective matching grooves 21, 22. The construction of the back portion of the wiper element is such that no metal parts protrude beyond the side limits thereof, such that any possibility of scratching or marring the windshield by engagement between the metal parts and windshield is eliminated. In addition, the novel constructions of the back portion of the blade and the receiving means on the pressure-distributing device coact to product a very quietly operating device. This last feature results from the limited amount of metal-to-metal contact between nonoperative parts as well as the close fit between the operative parts wherein play between parts is substantially reduced. Furthermore, the various methods of assembly resulting from my novel construction will produce results of substantial significance with respect to increased savings in manufacturing the blades. The steps and apparatus required for an assembly are simple and, therefore are, capable of being performed by semiskilled labor, effecting an additional saving.

Having thus described my invention, it is obvious that various other modifications may be made in the same without departing from the spirit of my invention; hence, I do not wish to be understood as limiting myself to the exact forms, constructions, arrangements and combinations of parts herein shown and described.

I claim:

1. A windshield wiper blade assembly comprising a blade and a pressure device, said blade being provided with a pair of matching blind grooves formed in the opposite sides thereof and facing outwardly with respect to the center of said blade, a plurality of notches formed between the grooves and the back of the blade, means carried by the pressure device and disposed in said notches, and means in the grooves on each side of the blade connecting with the means on the pressure device for attaching the pressure device to the blade.

2. A windshield wiper blade assembly comprising a blade and a pressure device, said blade being provided with a pair of matching blind grooves formed substantially the full length of the opposite sides thereof and facing outwardly with respect to the center of said blade, a plurality of longitudinally spaced matching notches formed between the grooves and the back of the blade, spaced means formed on the pressure device and disposed in said notches, and flexible means in the grooves on each side of the blade extending the length of the grooves and connecting with the spaced means on the pressure device for attaching the pressure device to the blade.

3. A windshield wiper blade assembly comprising an elongate wiper blade having a resilient wiper element and a back portion joined thereto by a thin intermediate portion, a pair of matching grooves formed in the opposite sides of the back portion throughout a major part of the length of the back portion, a pair of resilient backing strips seated in said grooves and flexible in a plane substantially perpendicular to a surface being wiped and rigid in a plane substantially perpendicular thereto, a plurality of matching notches formed in opposite sides of the back portion between the grooves and the back of the back portion for exposing portions of the backing strips, and a pressure device having portions connected to the exposed portions of the backing strips within the confines of the notches.

4. A windshield wiper blade assembly comprising a blade having a pair of blind grooves formed down the opposite sides thereof, a plurality of longitudinally spaced matching notches formed between each groove and the back of the blade, a pair of resilient backing strips flexible in a plane lying substantially perpendicular to a surface being wiped and rigid in a plane perpendicular thereto seated in said grooves, a pressure device having a pair of secondary yokes connected together by a primary bridge means, and clip means formed on the end portions of said secondary yokes and extending through the notches into engaging relation with the backing strips whereby the wiper blade is assembled to the pressure device.

5. A windshield wiper element having a wiping portion and a back portion joined thereto by a thin intermediate portion, a pair of longitudinally disposed matching blind grooves formed in the opposite sides of said back portion, and a plurality of matching notches formed in the back portion between the grooves and the back of said back portion.

6. In a windshield wiper blade assembly, an elongate resilient wiper element having a wiper head portion and a back portion, said back portion having a pair of grooves formed longitudinally therein, a pair of separate spaced-apart elongate flexible supporting means nested in said grooves, means on said back portion formed integrally therewith at the ends of said grooves for limiting longitudinal movement of said supporting means, and a pressure device having means affording connections with said supporting means as spaced locations along the length of the wiper element, the length of said elongate supporting means not exceeding the length of a respective groove.

References Cited in the file of this patent

UNITED STATES PATENTS

| 2,596,063 | Anderson | May 6, 1952 |
| 2,658,223 | Enochian | Nov. 10, 1953 |
| 2,728,100 | Oishei | Dec. 27, 1955 |
| 2,741,791 | Scinta | Apr. 17, 1956 |
| 2,750,617 | Oishei | June 19, 1956 |
| 2,861,289 | Nesson | Nov. 25, 1958 |
| 2,925,615 | Krohm | Feb. 23, 1960 |

FOREIGN PATENTS

| 619,320 | Great Britain | Mar. 8, 1949 |

UNITED STATES PATENT OFFICE
CERTIFICATE OF CORRECTION

Patent No. 3,003,174 October 10, 1961

John W. Anderson

It is hereby certified that error appears in the above numbered patent requiring correction and that the said Letters Patent should read as corrected below.

Column 6, line 28, for "as spaced" read -- at spaced --.

Signed and sealed this 10th day of April 1962.

(SEAL)
Attest:

ERNEST W. SWIDER
Attesting Officer

DAVID L. LADD
Commissioner of Patents